United States Patent [19]

Blain et al.

[11] Patent Number: 4,741,460
[45] Date of Patent: May 3, 1988

[54] PROCESS AND APPARATUS FOR DISPENSING A PARTICULATE SOLID

[75] Inventors: William A. Blain, Spring Valley; Amal C. Bhattacharjee, Jackson Heights, both of N.Y.

[73] Assignee: Nabisco Brands, Inc., Parsippany, N.J.

[21] Appl. No.: 724,559

[22] Filed: Apr. 18, 1985

[51] Int. Cl.[4] .............................................. B67D 5/08
[52] U.S. Cl. .................................... 222/55; 222/200; 198/771
[58] Field of Search ............... 222/52, 55, 200, 161, 222/160; 198/771

[56] References Cited

U.S. PATENT DOCUMENTS

| | | | |
|---|---|---|---|
| 2,584,444 | 2/1952 | Greenberg | 222/200 |
| 2,622,766 | 12/1952 | Simon | 222/55 |
| 2,637,434 | 5/1953 | Harper | 222/55 |
| 2,917,207 | 12/1959 | Prowse et al. | 222/55 |
| 3,012,697 | 12/1961 | Rouse, Jr. et al. | 222/181 |
| 3,028,053 | 4/1962 | Brown et al. | 222/161 |
| 3,110,419 | 11/1963 | Atkins et al. | 222/55 |
| 3,139,216 | 6/1964 | Mell | 222/55 |
| 3,139,217 | 6/1964 | Mell | 222/55 |
| 3,146,910 | 9/1964 | Varner | 222/55 |
| 3,362,585 | 1/1968 | Nessim et al. | 222/55 |
| 3,648,596 | 3/1972 | Zito | 99/450.7 |
| 3,759,218 | 9/1973 | Korstvedt | 118/18 |
| 3,877,585 | 4/1975 | Burgess, Jr. | 198/771 |
| 4,202,466 | 5/1980 | Cook | 222/55 |

FOREIGN PATENT DOCUMENTS

EP0113927 7/1984 European Pat. Off.
2057307A 4/1981 United Kingdom.

*Primary Examiner*—Joseph J. Rolla
*Assistant Examiner*—Kenneth Noland
*Attorney, Agent, or Firm*—Richard Kornutik

[57] ABSTRACT

A particulate solid is dispensed on to articles by depositing the particulate solid on a vibrating dispensing member having a slot cut therethrough, this slot making an acute angle within the direction in which the particulate solid moves along the dispensing member, and moving the articles beneath the slot as the particulate solid is falling therethrough.

7 Claims, 3 Drawing Sheets

PROCESS AND APPARATUS FOR DISPENSING A PARTICULATE SOLID

BACKGROUND OF THE INVENTION

This invention relates to a process and apparatus for dispensing a particulate solid. More specifically, it relates to a process and apparatus in which a particulate solid is dispensed on to articles in such a manner that a very uniform distribution of the particulate solid over the surfaces of the articles is obtained.

In many material handling processes, it is necessary to coat articles with a particulate solid in such a manner that the articles receive a uniform amount of the particulate solid per unit area. For example, in food processing it may be desired to treat dough or baked goods with particulate solids such as salt (sodium chloride), cheese powder, sesame seeds or sunflower seeds.

One situation in which very uniform dispensing of a particulate solid on to the surface of articles is of great importance is the addition of so-called "topping salt" to cracker doughs. In the production of crackers, a dough is rolled into thin sheets. These thin sheets are then either cut into the appropriate dough shapes, if round or similarly-shaped crackers are desired, or are indented with the shapes of square or rectangular crackers, so that the individual crackers can easily be separated from the sheet after baking. Immediately before baking, salt is sprinkled on to the upper surface of the dough to provide the desired taste in the final crackers. Uniform distribution of the salt is desired in order to avoid variations in the taste of the crackers. Moreover, because of the association of sodium with hypertension, many people are now restricting their salt intake and food manufacturers are providing a variety of low sodium products, including low sodium crackers. Government regulations either have, or in the future are likely to, limit the amount of sodium which can be incorporated in low sodium foodstuffs and require specification on the labels of the quantity of sodium in each serving of the foodstuff. If the salt is not spread uniformly over the cracker dough, certain crackers may have sodium contents which exceed the allowable maximum and which will differ in their sodium content from the amounts specified on the label; either problem will subject the food manufacturer to legal penalties.

The uniform dispensing of salt on to cracker dough is made particularly difficult by the large size and high speeds of modern bakery equipment. For example, typical commercial equipment for producing crackers produces belts of dough 36 inches (914 mm.) wide traveling at speeds about 60 to about 180 feet (18.3 to 54.9 m.) per minute. With these wide belts of dough and high rates of dough movement, any momentary fluctuations in amount of lateral distribution of salt across the belt of dough will produce very pronounced variations in the amount of salt on particular crackers.

Various attempts have been made to provide apparatus which will uniformly distribute salt over a belt of dough. In one form of such apparatus, a stream of salt is simply deposited on a wide sloping plate which is intended to distribute the salt over the width of the belt. Such apparatus fails to ensure uniform distribution of the salt; almost inevitably, the center of the belt of dough receives more salt per unit area than the side edges.

A more sophisticated salt spreader is manufactured by Fedco Systems Inc., 2170 Gunn Highway, Odessa, Fla. 33556. In the Fedco salter, a hopper feeds salt on to a roller which has grooves cut around its circumference. A seal is in contact with the roller where it leaves the hopper. Salt from the hopper falls into the grooves and excess salt is wiped from the roller by the seal, which acts in the same manner as a doctor blade. As the roller rotates, it comes into contact with a plow which fits into the grooves and releases the salt on to the belt of dough traveling below it.

Another type of salter manufactured by Heat & Control Inc., 225 Shaw Road, South San Francisco, Calif. 94080 feeds salt from a hopper on to a conveyor belt, which is formed from a metal mesh. A plate is disposed under a portion of the mesh belt to prevent flow of salt therethrough. The salt enters into the apertures in the mesh belt and, as the belt leaves the plate, the salt falls from the upper land of the belt through the lower land on to the product.

A further type of apparatus for dispensing particulate solids sold commercially under the name Sivo-O-Dust by Christy Machine Company, 118 Birchard Avenue, P.O. Box 32, Fremont, Ohio 43420 operates in a manner similar to the Fedco salter discussed above in that the salt is fed from a hopper on to a grooved drum. However, in the Siva salter the grooves on the drum extend axially along the drum and are of substantially triangular cross-section tapering inwardly. As the roller passes through the hopper, the grooves fill with salt and as the drum turns the salt is released near the bottom of the drum on to the belt which carries the dough beneath the drum.

The Fedco, Heat & Control and Siv-O-Dust salters all suffer from the disadvantage that they are essentially constant-volume rather than constant-weight salters, and the bulk density of salt can vary considerably depending upon crystal size and form, moisture content and other factors. Consequently, in practice all of these salters are subject to variations in weight of salt dispensed per unit area of approximately 5 percent, a variation which leads to problems when one is salting low sodium crackers.

Vibrating conveyors, in which a particulate solid is caused to move along a surface by vibrating the surface, are used in various industries for conveying particulate solids. We have been made attempts to use a form of vibratory feeder in which salt is allowed to pass over the edge of a vibrating plate to spread salt over a belt of dough, in the hope that the salt would spread uniformly across the vibrating plate and produce a uniform dispersion of salt on the belt of dough. In practice, however, it has been found that simply allowing salt to flow off one edge of a vibrating plate does not produce uniform distribution of salt across the width of a wide belt such as those used in commercial cracker manufacturing equipment.

Various systems for delivering a particulate solid at a constant weight per unit time are known. For example, U.S. Pat. Nos. 3,139,216 and 3,139,217, both to Mell, describe an apparatus in which a particulate solid flows from a hopper on to a conveyor belt. A weight sensing device is dispensed below the conveyor belt and measures the weight of the particulate solid on the conveyor belt. An electrically-operated control system receives signals from the sensing device and signals indicating the speed of the conveyor belt, and adjusts the speed in order to ensure that the particulate solid is discharged from the conveyor belt at a constant weight per unit time.

U.S. Pat. No. 2,622,766 to Simon describes an apparatus rather similar to that described in the Mell patents; this apparatus includes a conveyor belt, a means for feeding a particulate solid on to the conveyor belt and a weight sensing means sensitive to the weight of the material on the conveyor. The output from the weight sensing means is supplied to a control system, which either varies the speed of the conveyor belt, or varies the rate of operation of the feeding apparatus, so that a controlled amount of bulk material is supplied at a constant rate. When the conveyor belt speed is fixed, the adjustable feeding mechanism may include either a feeding aperture of variable size, or a variable-speed auger.

U.S. Pat. Nos. 2,637,434 to Harper, 2,917,207 to Prowse et al., 3,362,585 to Nessim et al., and 3,110,419 to Atkins et al., all describe various types of feeding apparatus in which a particulate solid flows from a hopper through an aperture on to a belt, and in which a load sensor is provided to measure the weight of particulate solid on the belt. The size of the aperture through which the particulate solid leaves the hopper is adjusted in response to the weight of material sensed by the weight sensor.

None of the aforementioned patents describe any mechanism for distributing the steady stream of particulate solid which they produce uniformly across a discharge opening of substantial width.

It will be seen that there is thus a need for a process and apparatus for uniformly distributing a particulate solid over articles which is capable of spreading the particulate solid uniformly across an article or articles of substantial width, and which does not depend upon measuring the volume of the solid being dispensed. This invention provides such a process and apparatus.

SUMMARY OF THE INVENTION

This invention provides a process for dispensing a particulate solid on to articles, this process comprising depositing the particulate solid on to an intake section of a dispensing member, the dispensing member having an elongate slot extending therethrough, the intake section being spaced from the slot, vibrating the dispensing member so as to cause the particulate solid to move along the dispensing member in a direction which makes an acute angle with the length of the slot and to drop through the slot, and moving articles beneath and across the slot while the particulate solid is dropping through the slot, thereby causing the particulate solid to be deposited upon the articles.

This invention also provides apparatus for dispensing a particulate solid on to articles, the apparatus comprising a dispensing member having an elongate slot extending therethrough, this dispensing member having an intake section spaced from the slot, supply means for depositing the particulate solid on the intake section of the dispensing member, vibrator means for causing the dispensing member to vibrate so as to cause the particulate solid on the dispensing member to move along the dispensing member in a direction which makes an acute angle with the length of the slot, and to drop through the slot, and transport means for transporting the articles beneath and across the slot in the dispensing member.

DETAILED DESCRIPTION OF THE DRAWINGS

Figure 1:
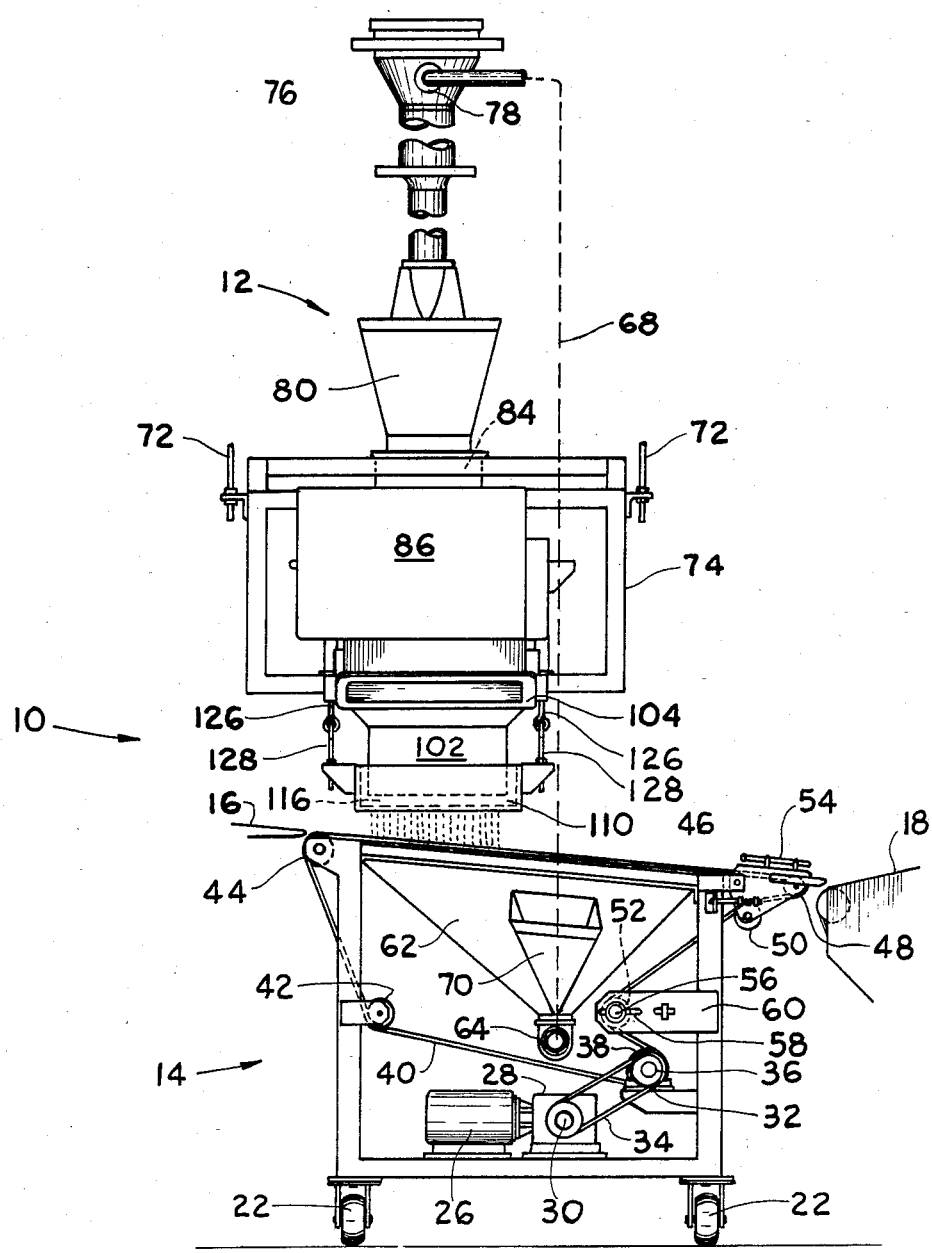
FIG. 1 is a side elevation of an apparatus of the invention.
Figure 2:
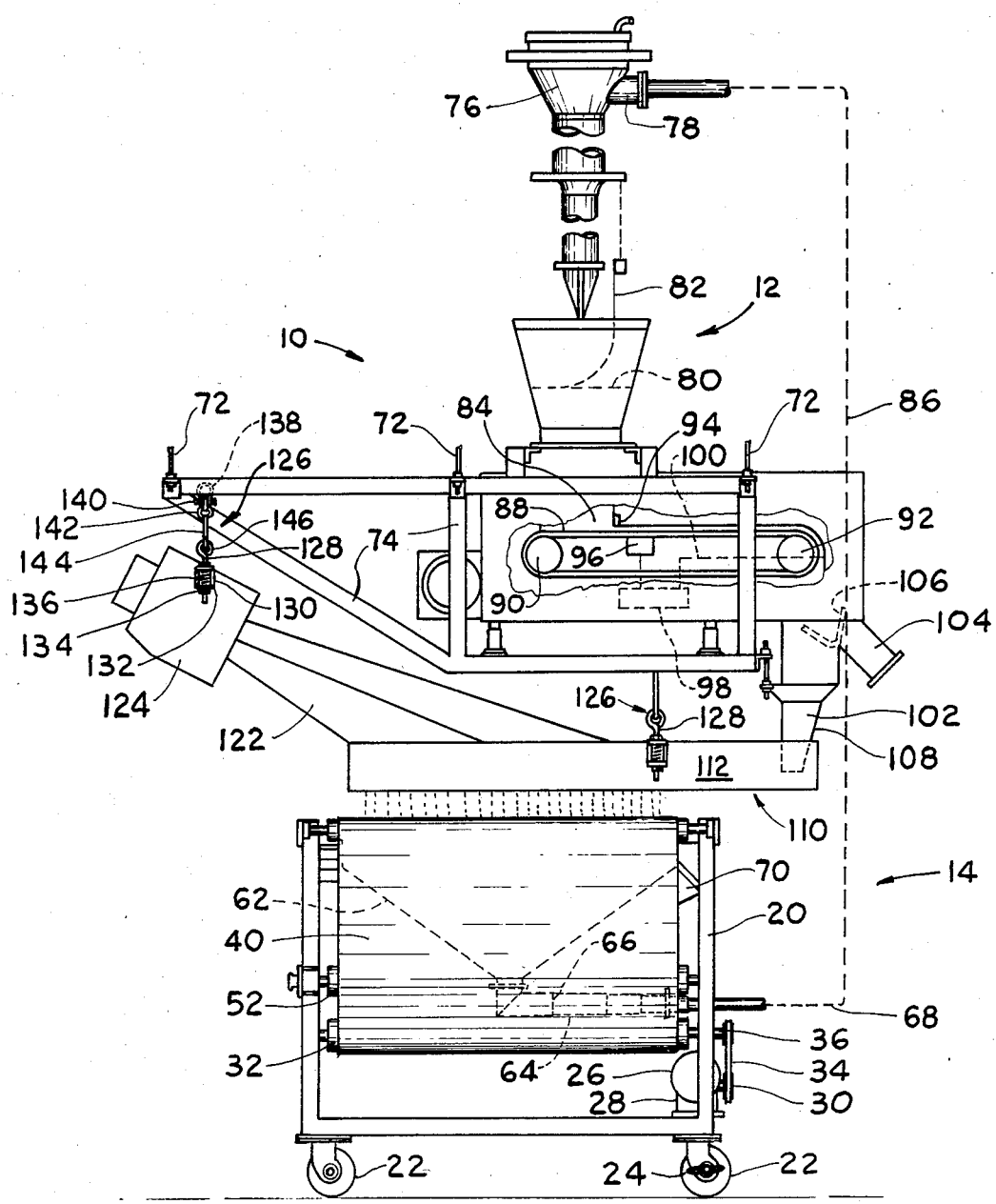
FIG. 2 is an end elevation of the apparatus shown in FIG. 1, looking from the right end of that Figure.
Figure 3:
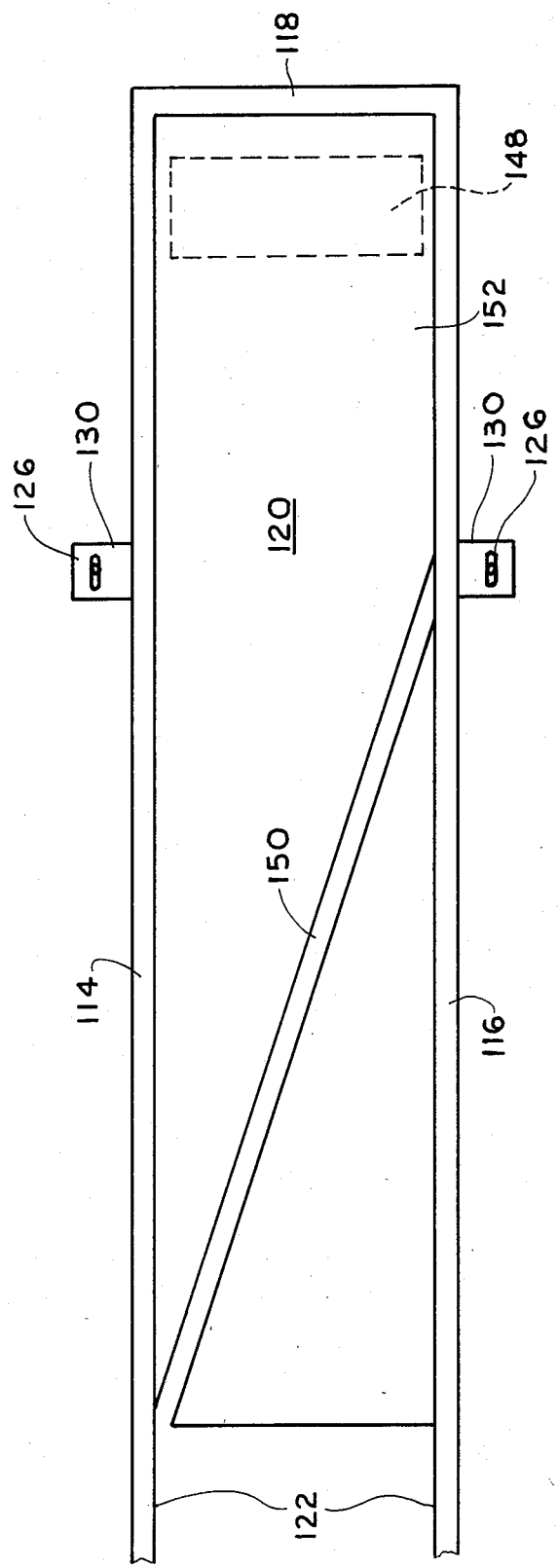
FIG. 3 is a top plan view of part of the dispensing member of the apparatus shown in FIGS. 1 and 2.

The apparatus of the invention (generally designated 10) shown in FIGS. 1 to 3 comprises two main sections, namely a dispensing section (generally designated 12), which serves to dispense the salt or other particulate material, and a transport section (generally designated 14), which serves to transport the articles to be sprinkled with salt or other particulate material beneath the dispensing section 12. The apparatus 10 is positioned in a conventional commercial cracker production line between the rotary cutter, which cuts (or indents) the dough sheet to form the individual crackers, and the oven. FIG. 1 shows schematically the belt conveyor 16, which carries the dough from the rotary cutter to the transport section 14, and the belt conveyor 18, which carries the dough from the outlet end of the transport section 14 to the oven.

The transport section 14 comprises an approximately cuboidal open framework 20 supported on four wheels 22. As indicated by the broken lines in FIG. 2, the wheels 22 are mounted on framework 20 so as to be rotatable about vertical axes, thereby facilitating movement of the whole transport section 14 when such movement is desired. Two of the wheels 22, at opposed ends of a base diagonal of the framework 20, are provided with wheel brakes 24 of a conventional type which can be used to prevent rotation of the wheel 22 to which they are attached, thereby preventing unwanted movement of the transport section 14 when the transport section is positioned in the production line. The mounting of the transport section upon the wheels 22 enables the transport section to be removed from the production line, thereby allowing easier access to the mechanical components of the transport section for cleaning or maintenance. Moreover, the wheel mounting of the transport section 14 has the advantage that, if the transport section fails, it can be rapidly removed from the production line and another transport section substituted, thereby reducing the length of the very expensive downtime of the whole production line which would otherwise be caused by mechanical failure of the transport section.

For purposes of safety, the side faces of the transport section 14 are covered with metal mesh guards, of a conventional type which will be familiar to those skilled in the art. However, the transport section is shown in FIGS. 1 and 2 with these guards removed in order to show the operating parts of the transport section.

An electric motor 26 is mounted adjacent the base of the framework 20 and drives, via a gear box 28, a driving sprocket 30. This sprocket 30 drives a driven sprocket 32 via a chain 34. The driven sprocket 32 is fixedly mounted on a shaft 36, which is in turn fixedly connected to a drive roller 38.

A belt conveyor 40, formed of steel mesh, passes around the drive roller 38 and around idler rollers 42, 44, 46, 48, 50 and 52. The position of the idler roller 48 can be adjusted by adjusting screws 54, so as to position the roller 48 in an appropriate position relative to the belt conveyor 18, which receives the dough from the belt 40 and carries it on to the oven. Also, the shaft 56 of the roller 52 is mounted in elongate slots 58 in support plates 60, thereby enabling the roller 52 to be adjusted horizontally to control the tension in the belt 40, in a manner which will be familiar to those skilled in the art. The uppermost run of the belt 40, between the rollers 44 and 46, carries the dough beneath the dispensing section 12, where the articles are sprinkled with salt (or any other particulate solid). Excess salt passes through the mesh belt 40 into a collection hopper 62 mounted in the upper part of the framework 20 and having the form of an inverted pyramid. The salt entering the collection hopper 62 collects at the lower point thereof and enters recycle tube 64, which is provided with a filter screen 66. Salt is recycled from the recycle tube 64 to the dispensing section 12 via a recycle line 68, under suction, as described in more detail below. On one face of the collection hopper 62 is formed a chute 70, through which additional salt can be introduced into the apparatus as needed.

The dispensing section 12 is completely separate from the transport section 14, there being no physical connection between these two sections of the apparatus 10. In contrast to the transport section 14, which is mounted upon the floor by means of the wheels 22, the dispensing section 12 is supported from the roof, or from a suitable load-bearing beam, by means of six steel cables 72. These steel cables 72 are attached to the upper part of a framework 74, which in turn supports the remaining components of the dispensing section 12.

The dispensing section 12 comprises a recycle unit 76 provided with a side tube 78 which receives the upper end of the recycled line 68. The recycled unit 76 is provided with a suction device (not shown) which applies a partial vacuum to the side tube 78, thereby causing salt to be recycled from the collection hopper 62 via the recycle tube 64 and the recycle line 68 to the dispensing section 12. Positioned beneath the recycle unit 76 is a hopper 80 provided with a level control 82 (shown only schematically in the drawings); this level control 82 switches the suction device of the recycle unit 76 on and off in order to hold the level of salt in the hopper 80 constant.

The hopper 80 has a lower extension 84 of rectangular cross-section which extends through a housing 86 and terminates adjacent a belt conveyor 88 passing around rollers 90 and 92, these rollers being supported on the housing 86. (In FIG. 2, the housing 86 is shown broken away, in order to show the belt 88, the rollers 90 and 92 and other parts described below. In reality, of course, the housing 86 is closed on all four sides.) Adjacent the belt 88, the lower extension 84 of the hopper 80 is provided with a vertically-slidable gate member 94. The lower edge of this gate member 94 extends adjacent and parallel to the upper surface of the belt 88 so as to leave between the gate member 94 and the belt 88 a metering slot of constant width extending almost the whole width of the belt 88. The salt flows out of the hopper through this slot between the gate member 94 and the belt 88, thereby forming a layer of substantially constant thickness on the belt 88. The thickness of this layer of salt can be adjusted manually by moving the gate member 94; automated control of the gate member may alternatively be employed.

The belt 88 is provided with a load sensor 96 which senses the load imposed by the belt, and hence the weight of the salt on the belt. After passing the sensor 96, the sale is discharged from the belt 88 adjacent the roller 92.

As indicated in a highly schematic manner in FIG. 2, the signal produced by the load sensor 96 is passed to a control unit 98, which sends a control signal along a line 100 to a motor (not shown), which in turn drives the roller 92, and hence controls the speed of the belt 88. The control unit 98 adjusts the rate of rotation of the roller 92, and hence the rate of movement of the belt 88, in response to the signal provided by the load sensing means in such a manner that the weight of the salt discharged from the belt 88 per unit time is held constant.

Since obviously the salt takes a finite time to travel from the sensor 96 to the point at which the salt is discharged from the belt 88, if the control unit 96 simply caused the rate of rotation of the roller 92 to vary immediately upon changes in the output from the sensor 96, the weight of salt delivered from the belt per unit time would not be constant; indeed, if the adjustment of the rate of rotation of the roller 92 were immediate, the amount of salt delivered per unit time would tend to "hunt", that is to say oscillate alternatively above and below the desires value. To avoid such hunting, the control unit 98 incorporates a time delay arranged to delay the response of the control unit to changes in the load sensed by the sensor 96 so as to compensate for the time which the belt 88 takes to travel from the point at which the load is sensed by the sensor 96 to the point at which the salt is discharged from the belt.

Assemblies comprising the housing 86, belt 88, the rollers 90 and 92, the sensor 96, the control unit 98 and the line 10 are available commercially. An appropriate unit for use in the apparatus of the present invention is the weight belt feeder manufactured by K-Tron Corporation, 20 Warrick Avenue, Glassboro, N.J. 08028 under the model no. W300.

After being discharged from the belt 88 adjacent the roller 92, the salt falls downwardly into a chute 102, which extends downwardly from the housing 86 and is supported by the framework 74. This chute 102 is provided with a side arm 104 and with a flap 106 which is pivotable about a horizontal axis disposed between the main portion of the chute 102 and the side arm 104. During normal operation of the dispensing section 12, the flap 106 is disposed in the substantially vertical position shown in FIG. 2, so that the flap 106 does not interfere with the fall of salt from the belt 88 into the chute 102. However, if it is desired to obtain samples of the salt, for example to check if the salt has become contaminated, the flap 106 may be manually pivoted, by means of a lever (not shown) provided on the outside of the chute 102, to the almost horizontal position shown in FIG. 2, in which the flap 106 diverts a portion of the salt falling from the belt 88 into the side arm 104, where the sample may be collected and removed for inspection and/or analysis.

As the salt falls from the belt 88 into the chute 102, it strikes a sloping side wall 108 adjacent the lower end of the chute and slides down this sloping side wall 108 into the dispensing member of the apparatus, which has the form of a trough generally designated 110. The trough 110 has a body section 112 which, as best seen in FIG. 3, has substantially the form of a rectangular box open at its upper face and at one end, and having side walls 114 and 116, an end wall 118 and a base 120. The trough 110 further comprises vibrator support members 122 extending upwardly and outwardly from the left-hand end (in FIG. 2) of the body section 112. A vibrator 124 is fixedly mounted on the support members 122.

The trough 110 and the vibrator 124 are suspended from the framework 74 at four separate points, two of these points being on opposed sides of the body section 112 and two being on opposed sides of the vibrator 124. Each of the suspension devices 126 used to support the vibrator and trough has its lower end a threaded shank 128 which passes freely through an aperture cut in the horizontal portion of an angle bracket 130 attached to the trough or vibrator. The threaded shank 128 is engaged in a threaded aperture provided in a suspension plate 132, which is *not* attached to the vibrator or trough. Beneath the plate 132, the threaded shank is engaged with a lock nut 134. A spring 136 is compressed between the plate 132 and the horizontal portion of the angle bracket 130. This arrangement enables the length of the suspension device 126 to be adjusted by screwing the threaded shank 128 into or out of the plate 132 and locking the shank in positive relative to the plate, by means of the lock nut 134, thereby setting the suspension device 126 to any desired length. Such adjustment of the lengths of the suspension devices 126 enables the base 120 of the trough to be set exactly horizontal, for reasons explained below. Also, the springs 136 reduce transmission of vibration from the vibrator and trough to the framework 74 of the dispensing section 12. To further reduce the transmission of the vibrations, it is preferred that the suspension members have the form shown in FIG. 2, comprising a shackle 138 passing through an aperture in an appropriate lug on the framework 74, a ring 140 engaged with the shackle 138, a thimble 142 engaged with the ring 140, a stranded steel rope 144 extending downwardly from the thimble 142 and a ring 146 supported by the rope 144 and integral with the threaded shank. The lengths of the suspension devices 126 are adjusted so that the base 120 of the trough is exaclty horizontal.

It should be noted that, as best seen in FIG. 1, although the lower end of the chute 102 extends into the trough 110, the trough is made slightly wider than the chute so that there is no physical contact between the trough and the chute. The absence of physical contact between the trough and the chute is important, since any such contact would result in substantial transmission of vibration from the trough to the chute, possibly resulting in damage to the dispensing section 12 of the apparatus 10.

The vibrator 124 is of a conventional type in which current is passed through an electromagnet, thereby attracting an armature towards the electromagnet. Return of the armature is effected by means of springs of such elastic force that the return stroke of the armature is slower than its forward stroke under the action of the electromagnet. An appropriate commercially-available vibrator of this type is manufactured by Eriez Magnetics, Erie, Pa. under the model no. 62B.

The vibrator 124 is mounted so that the resultant vibrations occur in a plane running approximately along the center line of the vibrator support members 122. Accordingly, the vibrator 124 induces, in the horizontal base 120 of the trough, vibrations which lie in a plane at an angle of approximately 20° to the horizontal plane of the base 120, these vibrations having a rapid forward stroke directed towards the vibrator approximately along the center line of the vibrator support members 122 and a slower return stroke in the opposed direction. Such vibrations cause the salt which is deposited on an intake section 148 (FIG. 3) of the trough immediately below the chute 102 to move longitudinally along the trough. Moreover, as the salt moves along the trough it becomes very uniformly distributed across the width of the trough because the random impulses acting on the salt particles as they move into and out of contact with the vibrating base of the trough randomizes the distribution of salt across the width of the trough. The side walls 114 and 116 prevent loss of salt as it flows along the trough.

An elongate slot 150 is cut through the base 120 of the trough and extend the full width of the base, the length of the slot 150 being at an angle of approximately 19° to the length of the trough, and hence at the same angle to the direction of movement of the salt along the trough. Although not apparent in FIG. 3, the base 120 of the trough is provided with lips which extend downwardly on either side of the slot. These lips serve to strengthen the trough. It should be noted that the base 120 of the trough has an unslotted section 152 between the intake section 148 and the part of the slot 150 closest to the intake section. This unslotted section, which has a length of approximately 30 cm., allows the salt to become highly uniformly distributed across the width of the trough 110 before the salt reaches the slot 150. The salt falls through the slot 150 along the whole length thereof, so that the salt is sprinkled over the whole width of the dough on the belt 40. Since the length of the trough runs perpendicular to the direction of movement of the belt 40 (as best seen in FIG. 1), the "curtain" of salt falling from the slot 150 does not extend perpendicular to the direction of movement of the belt 40 but diagonally across this belt, the length of the resultant "dusting zone" measured along the belt 40 being approximately ⅓ as great as the width of the dusting zone measured across the belt 40.

It has been found that using a slot which runs at an acute angle to the direction of motion of the salt gives a significant increase in the uniformity of distribution of salt passing through the slot, and hence in the uniformity of distribution of the salt across the dough passing beneath the slot. The provision of the slot extending diagonally across the rectangular trough assists in obtaining more uniform vibraton of the base of the trough, due to better weight balance along the length of the slot, and hence assists in achieving uniform dispensing of the salt along the slot. Although the angle between the slot and direction of travel of the salt can vary over a wide range of (say) 5° to 80°, we prefer that the acute angle between the length of the slot and the direction of motion of the salt be in the range of 5° to 45°, and most preferably in the range of 10° to 19°. Using a relatively small acute angle, such as the 19° angle illustrated in FIG. 3, has the additional advantage of reducing the size of the trough needed to sprinkle salt on a dough belt of a given width. Moreover, the apparatus can easily be adapted to provide dusting zones of various widths by using troughs having slots cut at differing angles to their lengths. For example, if the width of the dough on the belt 40 is 36 inches (91.4 cm.) and the slot runs at approximately 19° to the length of the trough, the trough need only have a width (measured internally between the side walls 114 and 116) of 12 inches (30.5 cm.) This reduces the bulk and cost of the trough, and the weight, cost and power consumption of the vibrator needed to produce a given degree of vibration in the trough.

The frequency and amplitude of the vibration imparted to the trough by the vibrator 124 can vary widely, provided they are sufficient to achieve uniform distribution of the salt (or other particulate material being dispensed) across the width of the trough, and the optimum frequency and amplitude for any particular apparatus and type of particulate solid can easily be determined empirically. It has been found that frequencies in the range of about 20 to about 200 Hz. and amplitudes of vibration in the range of 0.5 to about 3 mm. can be used. More specifically, we prefer to use a vibration having a frequency of 60 Hz. since such a vibration is easy to generate from a standard 60 Hz. mains current, and an amplitude not exceeding about 0.065 inches (1.65 mm.).

As will be apparent to those skilled in the art, it is important that all surfaces of the apparatus which come into contact with the salt or the dough be made of materials which will not contaminate the salt or dough and which permit easy cleaning. Also, the nature of the internal surfaces of the trough is of great importance, since such surfaces not only most not contaminate the salt but must permit free flow of salt there across. The surfaces may be formed of, for example, stainless steel or be of metal coated with a smooth coating, for example polytetrafluoroethylene.

Although the amount of salt dispensed by the apparatus 10 described above will vary with the type of dough or other article being treated, we estimate that, when the apparatus is used for dispensing topping salt on to a belt of cracker dough 38 inches (964 mm.) wide moving at 150 feet (45.7 m.) per minute, the total amount of salt to be dispensed through the slot 150 will normally be in the range of about 2 to about 4 pounds (907 to 1814 g.) per minute. (The total salt consumption will of course be less because part of the dispensed salt will be recycled via the recycle line.) The requisite rate of salt transport may be effected using a ½ inch (13 mm.) slot between the gate member 94 and the belt 88 and a belt 88 12 inches (305 mm.) wide. Assuming a bulk density for the salt of approximately 80 lbs. ft$^{-3}$ (bulk specific gravity 1.29), the required speed of the belt 88 will be in the range of about 7.3 to about 14.5 inches (185 to 370 mm.) per minute, a speed which is well within the range of the commercially-available equipment discussed above.

It will be apparent to those skilled in the art that numerous changes and modifications can be made in the preferred embodiments of the invention described above without departing from the scope of the invention. In particular, those skilled in the art will be aware that there are methods for promoting unidirectional flow of a particulate solid across a vibrating surface other than that used in the apparatus described above. For example, the base 120 of the trough may be inclined to the horizontal and vibrated in a vertical plane so that the salt in effect "flows" down the inclined base of the trough. Alternatively, the base 120 may be provided with transverse grooves of asymmetric cross-section, the walls of the grooves facing down the direction of flow being disposed at a greater angle to the horizontal than the walls facing up the direction of the flow. Also, the base might be covered with a pile in which the fibers are inclined down the direction of flow of the particulate solid.

Although the invention has been described above in its application in dispensing salt on to cracker dough, it will be apparent to those skilled in the art that the apparatus and process of the present invention can be used in numerous other applications. For example, the apparatus might be used to distribute cheese powder, sesame seeds or sunflower seeds on to doughs in various forms, including cracker doughs and dough pieces intended for forming buns or other baked goods. The apparatus might also be used to sprinkle sugar or coloring or flavoring particles onto goods after baking. Finally, the apparatus could be used to be used to dispense a uniform layer of flour on a moving belt, when such a flour layer is needed to prevent particles carried by the belt sticking to the belt.

In view of the numerous changes and modifications which can be made in the apparatus of the present invention previously described without departing from the scope of the invention, the whole of the foregoing description is to be construed in an illustrative and not in a limitative sense, the scope of the invention being defined solely by the appended claims.

We claim:

1. A process for dispensing a particulate solid on to articles, comprising the steps of:
    (a) forming a layer of particulate solid on a surface of a movable belt, said layer being of substantially constant thickness; and
    (b) sensing weight of the particulate solid on the belt; and
    (c) adjusting rate of movement of the belt so that a weight of a particulate solid discharged from the belt is substantially constant per unit time, said adjustment being carried out using a time delay to compensate for a time which the belt takes to travel from a point at which the weight of the particulate solid on the belt is sensed to a point at which the particulate solid is discharged from the belt; and
    (d) depositing the particulate solid onto an intake section of a dispensing member, the dispensing member having an elongated slot extending therethrough, the intake section being spaced from the slit, the dispensing member being substantially horizontal; and
    (e) vibrating the dispensing member in a direction which lies in a vertical plane and makes an acute angle to the horizontal so as to cause the particulate solid to move along the dispensing member in a direction which makes an acute angle with the length of the slot, and to drop through the slot; and
    (f) moving the articles beneath and across the slot while the particulate solid is dropping through the slot, thereby causing the particulate solid to be deposited upon the articles.

2. An apparatus for dispensing a particulate solid on to articles, comprising:
    (a) a dispensing member having an elongate slot extending therethrough and an intake section spaced from the slot;
    (b) supply means for depositing the particulate solid onto said intake section, said supply means comprising a movable belt, means for forming a layer of the particulate solid having a substantially constant thickness onto a surface of said belt, load sensing means for sensing a weight of the particulate solid on the belt, and control means for adjusting a rate of movement of the belt in response to said load sensing means in such a manner that a weight of the particulate solid discharged from the belt per unit time is held substantially constant, said control means comprising a delay means arranged to delay a response of the control means to changes in said weight sensed by the sensing means so as to compensate for a time which the belt takes to travel from a point at which said weight is sensed by the sensing means to a point at which the particulate solid is discharged from the belt;

(c) vibrator means for causing the dispensing member to vibrate in such a manner as to cause the particulate solid on the dispensing member to move therealong in a direction which makes an acute angle with the length of the slot, and to drop through the slot; and (d) transort means for transporting the articles beneath and across the slot in the dispensing member.

3. Apparatus for dispensing a particulate solid on to articles, the apparatus comprising:

a dispensing member having an elongate slot extending therethrough, the dispensing member having an intake section spaced from the slot;

vibrator means for causing the dispensing member to vibrate in such a manner as to cause the particulate solid on the dispensing member to move therealong in a direction which makes an acute angle with the length of the slot, and to drop through the slot;

transport means for transporting the articles beneath and across the slot in the dispensing member;

a movable belt having an outlet end arranged to deliver the particulate solid to the dispensing member;

a gate member disposed adjacent the belt so as to leave a metering slot of substantially constant width between the belt and an adjacent edge of the gate member;

a hopper arranged so that the particulate solid passes through the metering slot, thereby forming the particulate solid into a layer of substantially constant thickness on the belt;

load sensing means for sensing the weight of the particulate solid on the belt; and control means for adjusting the rate of movement of the belt in response to the load sensing means in such a manner that the weight of the particulate solid discharged from the belt per unit time is held substantially constant, the control means incorporating a delay means arranged to delay the response of the control means to changes in the load sensed by the sensing means so as to compensate for the time which the belt takes to travel from the point at which the load is sensed by the sensing means to the point at which the particulate solid is discharged from the belt.

4. Apparatus for dispensing a particulate solid onto articles, the apparatus comprising:

a dispensing member having an elongated slot extending therethrough, the dispensing member having an ntake section spaced from the slot;

supply means for depositing the particulate solid on the intake section of the dispensing member, said supply means comprising a movable belt, means for forming, on a surface of said belt, a layer of the particulate material, said means for forming having a gate member disposed adjacent the belt so as to leave a metering slot of substantially constant width between the belt and an adjacent edge of the gate member, said layer being of substantially constant thickness, load sensing means for sensing the weight of the particulate solid on the belt, and control means for adjusting the rate of movement of the belt in response to the load sensing means in such a manner that the weight of the particulate solid discharged from the belt per unit time is held substantially constant, the supply means being arranged such that the particulate solid passes through the metering slot, thereby forming the particulate solid into the layer of substantially constant thickness on the belt;

vibrator means for causing the dispensing member to vibrate in such a manner as to cause the particulate solid on the dispensing member to move therealong in a direction which makes an acute angle with the length of the elongated slot, and to drop through the slot; and transport means for transporting the articles beneath and across the elongated slot in the dispensing member.

5. Apparatus for dispensing a particulate solid onto articles, the apparatus comprising:

a dispensing member having an elongated slot extending therethrough, the dispensing member having an intake section spaced from the slot;

supply means for depositing the particulate solid on the intake section of the dispensing member, said supply means comprising a movable belt, means for forming, on a surface of said belt, a layer of the particulate material, said layer being of substantially constant thickness, load sensing means for sensing the weight of the particulate solid on the belt, and control means for adjusting the rate of movement of the belt in response to the load sensing means in such a manner that the weight of the particulate solid discharged from the belt per unit time is held substantially constant;

vibrator means for causing the dispensing member to vibrate in such a manner as to cause the particulate solid on the dispensing member to move theralong in a direction which makes an acute angle with the length of the slot, and to drop through the slot;

transport means for transporting the articles beneath and across the slot in the dispensing member, said transport means comprising a belt having apertures to allow excess particulate solid falling onto the belt to pass therethrough;

a collector for collecting particulate solid passing through the apertures in the belt; and means for recycling the particulate solid received in the collector to the supply means.

6. An apparatus for dispensing a particulate solid onto articles, the apparatus comprising:

(a) a movable belt;

(b) a gate member disposed adjacent the belt so as to leave a metering slot of substantially constant width between the belt and an adjacent edge of the gate member, whereby means are provided for forming on the surface of this belt a layer of the particulate solid, said layer being of substantially constant thickness;

(c) load sensing means for sensing the weight of the particulate solid on the belt;

(d) control means for adjusting the rate of movement of the belt in response to the load sensing means in such a manner that the weight of the particulate solid discharged from the belt per unit time is held substantially constant, whereby supply means is provided for depositing the particulate solid on an intake section of a dispensing member, the supply means being arranged such that the particulate solid passes through the metering slot, thereby forming said layer;

(e) a dispensing member having an elongate slot extending therethrough, the dispensing member having an intake section spaced from the elongated slot;

(f) vibrator means for causing the dispensing member to vibrate vertically in such a manner as to cause the particulate solid on the dispensing member to move therealong in a direction which makes an acute angle with the length of the elongated slot, and to drop through the elongated slot;

(g) transport means for transporting the articles beneath and across the slot in the dispensing member.

7. An apparatus for dispensing a particulate solid onto articles, the apparatus comprising:

(a) a movable first belt;
(b) means for forming on the surface of said first belt a layer of the particulate solid, said layer being of substantially constant thickness;
(c) load sensing means for sensing the weight of the particulate solid on said first belt;
(d) control means for adjusting the rate of movement of said first belt in response to the load sensing means in such a manner that the weight of the particulate solid discharged from said first belt per unit time is held substantially constant, whereby supply means is provided for depositing the particulate solid on an intake section of a dispensing member, the supply means being arranged such that the particulate solid passes through the metering slot, thereby forming said layer;

(e) a dispensing member having an elongate slot extending therethrough, the dispensing member having an intake section spaced from the elongated slot;

(f) vibrator means for causing the dispensing member to vibrate vertically in such a manner as to cause the particulate solid on the dispensing member to move therealong in a direction which makes an acute angle with the length of the elongated slot, and to drop through the elongated slot;

(g) a second belt for transporting the articles beneath and across the slot in the dispensing member, wherein said second belt has apertures to allow excess particulate solid falling on to the belt to pass therethrough;

(h) a collector for collecting particulate solid passing through the apertures in the belt;

(i) means for recycling the particulate solid received in the collector to the supply means.

* * * * *